US012669226B1

(12) United States Patent
Wang

(10) Patent No.: US 12,669,226 B1
(45) Date of Patent: Jun. 30, 2026

(54) SEALED AND WATERPROOF LIGHT-EMITTING DIODE (LED) LIGHT STRING STRUCTURE

(71) Applicant: Dongguan Huanhui Technology Co., Ltd., Dongguan City (CN)

(72) Inventor: Wei Wang, Dongguan City (CN)

(73) Assignee: Dongguan Huanhui Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/543,522

(22) Filed: Feb. 18, 2026

(30) Foreign Application Priority Data

Dec. 22, 2025 (CN) ......................... 202522716434.8

(51) Int. Cl.
*F21S 4/10* (2016.01)
*F21V 31/00* (2006.01)
*F21Y 115/10* (2016.01)

(52) U.S. Cl.
CPC .............. *F21S 4/10* (2016.01); *F21V 31/005* (2013.01); *F21Y 2115/10* (2016.08)

(58) Field of Classification Search
CPC .......... F21S 4/00–26; F21V 31/00–005; F21Y 2115/10
See application file for complete search history.

(56) References Cited

U.S. PATENT DOCUMENTS 11,384,907 B1 * 7/2022 Zou ....................... F21V 21/002

* cited by examiner

*Primary Examiner* — Jason M Han
(74) *Attorney, Agent, or Firm* — AVEK IP, LLC

(57) ABSTRACT

Some embodiments of the disclosure provide a sealed and waterproof light-emitting diode (LED) light string structure. In some examples, the sealed and waterproof light-emitting diode (LED) light string structure includes a series-connected wire. The series-connected wire is connected to a plurality of lamp holders, and the lamp holders are detachably connected to LED bulbs. In other examples, by dispensing an adhesive into an annular sealing groove or placing a special-shaped sealing ring, and then pressing the special-shaped sealing ring with an end cover, wiring ends of the lamp holders are sealed. After the bulbs are mounted on the lamp holders, inner cavities of the lamp holders may be sealed, such that the lamp holders are fully enclosed to perfectly preventing rainwater and the like from penetrating into the interiors of the lamp holders, with a good waterproof effect.

9 Claims, 8 Drawing Sheets

SEALED AND WATERPROOF LIGHT-EMITTING DIODE (LED) LIGHT STRING STRUCTURE

CROSS REFERENCE TO RELATED APPLICATION

This application claims priority to Chinese patent application number 2025227164348, filed on Dec. 22, 2025, the disclosure of which is incorporated by reference herein in its entirety.

FIELD OF THE DISCLOSURE

The disclosure relates to the technical field of luminaires and discloses a sealed and waterproof light-emitting diode (LED) light string structure.

BACKGROUND

With the popularization of electric power, luminaires have entered thousands of households. People are no longer confined to using luminaires for general illumination but are more inclined to employ them to create diverse atmospheres. For example, luminaires with different light-emitting colors are formed into light strings, which are then fixed in places such as artificial trees, wall edges, fences, and ceiling tops. However, lamp holders of existing light strings, such as an outdoor lamp holder structure disclosed in US Patent No. US2020132281A1, are poor in waterproof effect. Such lamp holders are poor in sealing performance, and when used outdoors, water vapor can easily enter the interiors of the lamp holders, thereby affecting the use effect and impairing the service lives of the light strings. Such structures prevent water accumulation by employing a water diversion method. However, water will still enter the interiors of the lamp holders. Whether the water inside the lamp holders can be discharged smoothly depends on weather, and the placement orientations of the lamp holders, and the like. Further, Chinese Patent No. CN202011227378.7 also discloses a lamp base structure. In this prior art, a waterproof and sealed encapsulation layer is formed by applying a coating process to the entire exterior of the lamp holder. However, this waterproof and sealed encapsulation layer can only solve the problem of water ingress at the wire end of the lamp holder, and there will still be a probability of water ingress at the bulb mounting end. Moreover, this fully enclosed structure not only increase the volume of the lamp holder, but also requires a large amount of encapsulation material, resulting in a higher cost.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a sealed and waterproof LED light string structure including a series-connected wire, one end of the series-connected wire being connected to a plug and the other end thereof being connected to a socket, where the series-connected wire is connected to a plurality of sealed and waterproof lamp holders, and the lamp holders are detachably connected to LED bulbs;

- the plurality of lamp holders are spaced apart and located between the plug and the socket;
- each of the lamp holders is provided with a lamp holder body, where the lamp holder body is provided with an accommodating cavity and an annular sealing groove, the lamp holder body is provided with a linear groove intersecting with the annular sealing groove, the annular sealing groove is filled with a first sealing member, and the series-connected wire passes through the linear groove and is located above the first sealing member;
- each of the lamp holders is further provided with an end cover, and the end cover is snap-fitted to the lamp holder body and applies pressure to the series-connected wire, thereby maintaining the formation of an end seal at the linear groove; and
- a second sealing member is further disposed between each of the lamp holders and each of the LED bulbs, and each of the LED bulbs is threadedly connected to each of the lamp holders to apply a pressure to the second sealing member, thereby forming sealing.

In some embodiments, the annular sealing groove includes a first curved segment, a first concave segment, a second curved segment and a second concave segment connected in sequence, and the first concave segment and the second concave segment correspond to the linear groove.

Optionally, the annular sealing groove includes a first curved segment, a first concave segment, a second curved segment and a second concave segment connected in sequence, the first concave segment and the second concave segment correspond to the linear groove, and when located in the linear groove, a surface of the series-connected wire is at least flush with the first curved segment or extends beyond an upper surface of the first curved segment.

In other embodiments, the annular sealing groove is filled with a surface sealing member, and the series-connected wire is located between the first sealing member and the surface sealing member.

Optionally, each of the lamp holders is provided with a waterproof groove, and the second sealing member is snap-fitted and secured in the waterproof groove.

Optionally, each of the LED bulbs includes a bulb shell, a snap ring is disposed at a neck of the bulb shell, and the second sealing member is disposed at the snap ring.

Optionally, each of the lamp holders is provided with a first electrical connecting piece and a second electrical connecting piece, the first electrical connecting piece is disposed on one side of the accommodating cavity and is provided with a first pointed protrusion that penetrates into the linear groove, and the second electrical connecting piece is disposed at a bottom of the accommodating cavity and is provided with a second pointed protrusion that penetrates into the linear groove.

Optionally, the end cover includes a cover plate, a pin and a wire-pressing rib, the pin is inserted into and fixed to the lamp holder body, the cover plate abuts against the first sealing member, and the wire-pressing rib abuts against the series-connected wire in the linear groove.

Optionally, each of the LED bulbs includes a metal lamp base, a bulb shell and a light-emitting unit disposed in the bulb shell and electrically connected to the metal lamp base, the metal lamp base is provided with a thread, and a connecting portion adapted to the metal lamp base is disposed on an inner wall of the accommodating cavity.

Optionally, the first sealing member is formed by dispensing an adhesive or is a special-shaped sealing ring, and the first sealing member protrudes beyond the annular sealing groove so as to cooperate with the end cover to form sealing.

Figure 1:
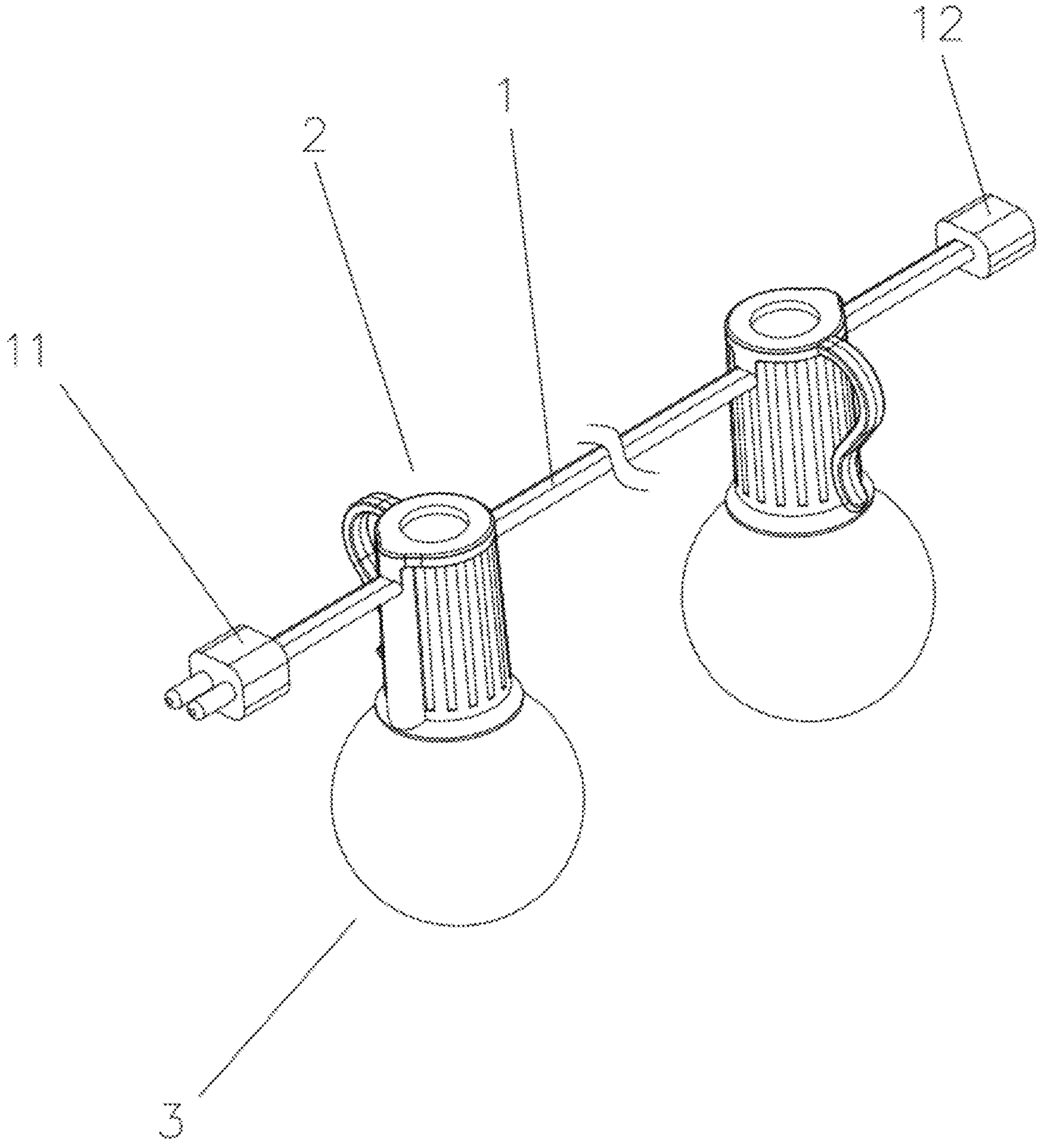
FIG. 1 shows a partial schematic structural diagram of a light string according to an embodiment of the disclosure.
Figure 2:
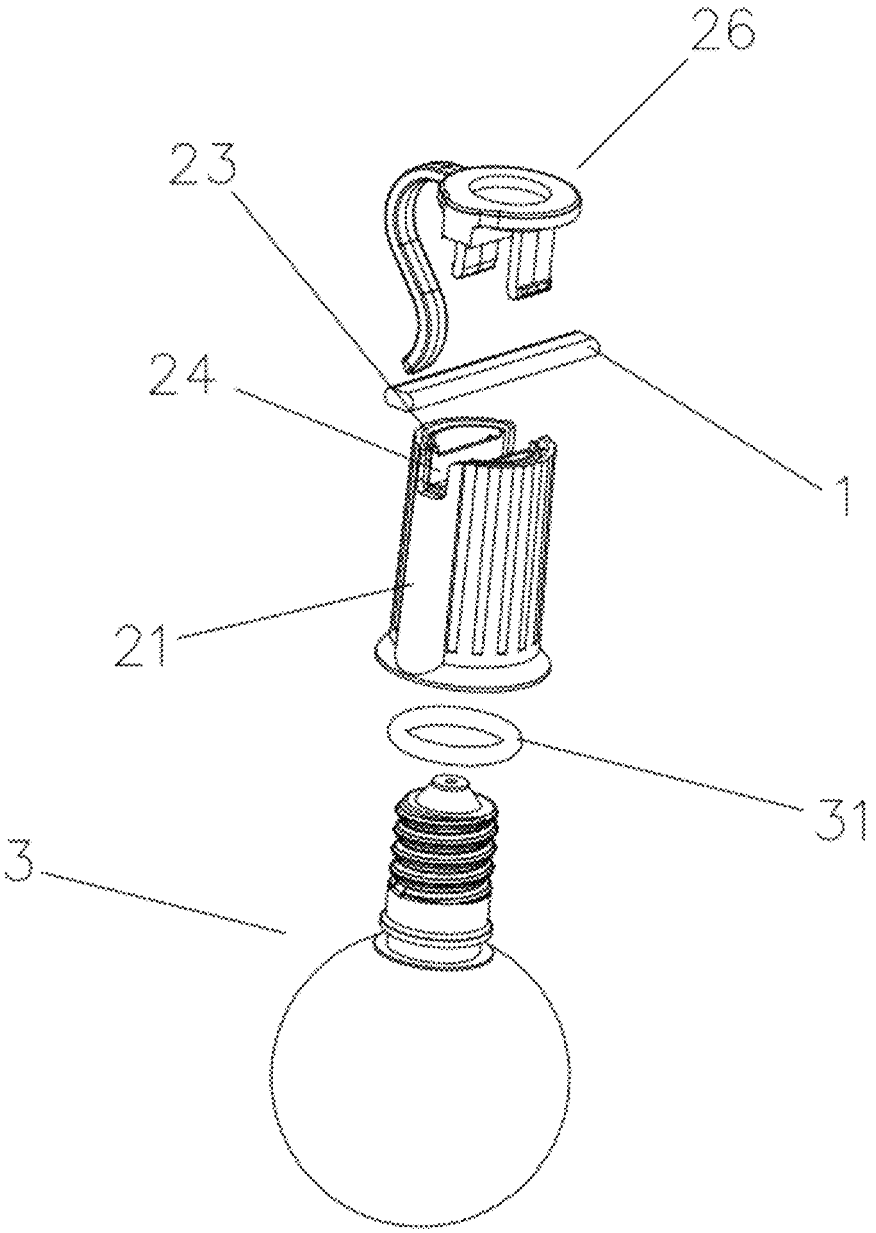
FIG. 2 shows an exploded schematic structural diagram of a lamp holder according to an embodiment of the disclosure.
Figure 3:
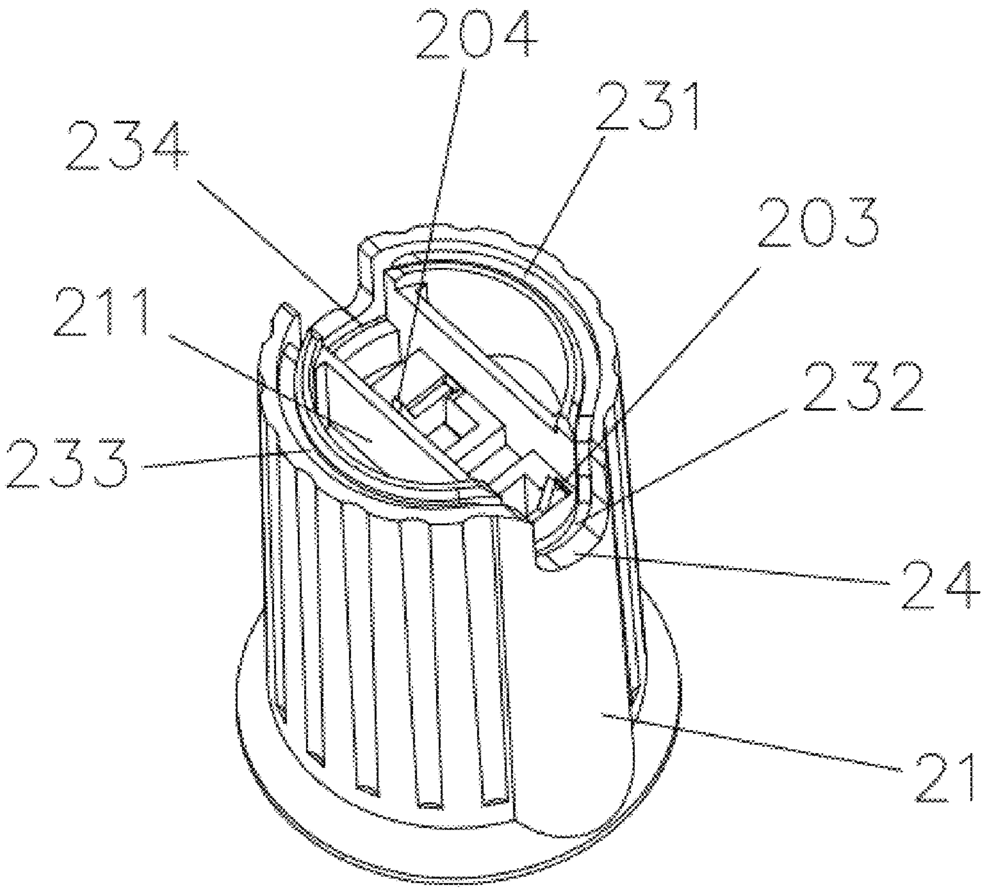
FIG. 3 shows a schematic structural diagram of an end of a lamp holder body according to an embodiment of the disclosure.

Reference numerals: 1, series-connected wire; 11, plug; 12, socket; 2, lamp holder; 201, first electrical connecting piece; 202, second electrical connecting piece; 203, first pointed protrusion; 204, second pointed protrusion; 21, lamp holder body; 211, plug-in port; 22, accommodating cavity; 221, connecting portion; 23, annular sealing groove; 231, first curved segment; 232, first concave segment; 233, second curved segment; 234, second concave segment; 24, linear groove; 25, first sealing member; 26, end cover; 261, cover plate; 262, pin; 263, wire-pressing rib; 264, hanging lug; 265, hook; 27, surface sealing member; 28, waterproof groove; 281, reverse buckling portion; 29, flared portion; 3, LED bulb; 31, second sealing member; 32, snap ring; 33, metal lamp base; 34, bulb shell; and 35, light-emitting unit.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure will be described in detail below in conjunction with FIGS. 1-8.

A sealed and waterproof light-emitting diode (LED) light string structure provided by the disclosure may include a series-connected wire 1, where one end of the series-connected wire 1 is connected to a plug 11 and the other end thereof is connected to a socket 12; the plug 11 is plugged into the power supply device to electrify the series-connected wire 1, and a plurality of series-connected wires 1 may be connected in series as the plug 11 is plugged into a socket 12 of another series-connected wire 1; the series-connected wire 1 is connected to a plurality of sealed and waterproof lamp holders 2, and the lamp holders 2 are detachably connected to LED bulbs 3; and the LED bulbs 3 herein are bulbs provided with intact light-emitting units, metal lamp bases, and transparent shells, and the plurality of lamp holders 2 provided with the LED bulbs 3 are connected to the series-connected wires 1 to form a light string structure.

The plurality of lamp holders 2 are spaced apart and located between the plug 11 and the socket 12. Optionally, the plurality of lamp holders 2 are connected in parallel, such that the circuit of the entire light string is more independent, which avoids the situation where the entire light string fails to emit light due to the disconnection of a single lamp holder.

Each of the lamp holders 2 is provided with a lamp holder body 21, where the lamp holder body 21 is provided with an accommodating cavity 22 and an annular sealing groove 23, the lamp holder body 21 is provided with a linear groove 24 intersecting with the annular sealing groove 23, the annular sealing groove 23 is filled with a first sealing member 25, and the series-connected wire 1 passes through the linear groove 24 and is located above the first sealing member 25. Since the linear groove 24 intersects with the annular groove 23, the first sealing member 25 is filled continuously. A portion of the first sealing member 25 passes through the linear groove 24 after being filled. After the series-connected wire 1 is placed into the linear groove 24, an end surface of the series-connected wire 1 abuts against the first sealing member 25, such that both ports of the linear groove 24 achieve sealing between the inner side and the outer side.

As an embodiment of the annular groove 23, the annular sealing groove 23 may include a first curved segment 231, a first concave segment 232, a second curved segment 233 and a second concave segment 234 connected in sequence, and the first concave segment 232 and the second concave segment 234 correspond to the linear groove 24. In this solution, the annular groove 23 is of a special-shaped structure with height differences. The first curved segment 231 and the first curved segment 233 are located at the top end of the lamp holder body 21, the first concave segment 232 and the second concave segment 234 are U-shaped, bottom grooves of the first concave segment 232 and the second concave segment 234 correspond to the bottom of the linear groove 24, two side grooves of the first concave segment 232 and the second concave segment 234 correspond to two side walls of the linear groove 24, and after the annular sealing groove 23 is filled with the first sealing member 25 and the series-connected wire 1 is placed into the annular sealing groove, the series-connected wire 1 abuts against the first sealing member 25 filling the first concave segment 232 and the second concave segment 234, such that the bottom and two sides of both ports of the linear groove 24 are sealed.

Each of the lamp holders 2 is further provided with an end cover 26, and the end cover 26 is snap-fitted to the lamp holder body 21 and applies pressure to the series-connected wire 1, thereby maintaining the formation of an end seal at the linear groove 24. After the series-connected wire 1 is placed into the linear groove 24, the end cover 26 is assembled to the lamp holder body 21. By applying a pressure via the end cover 26 and enclosing both ports of the linear groove 24 via the first sealing member 25, the linear groove 24 is fully sealed.

Figure 4:
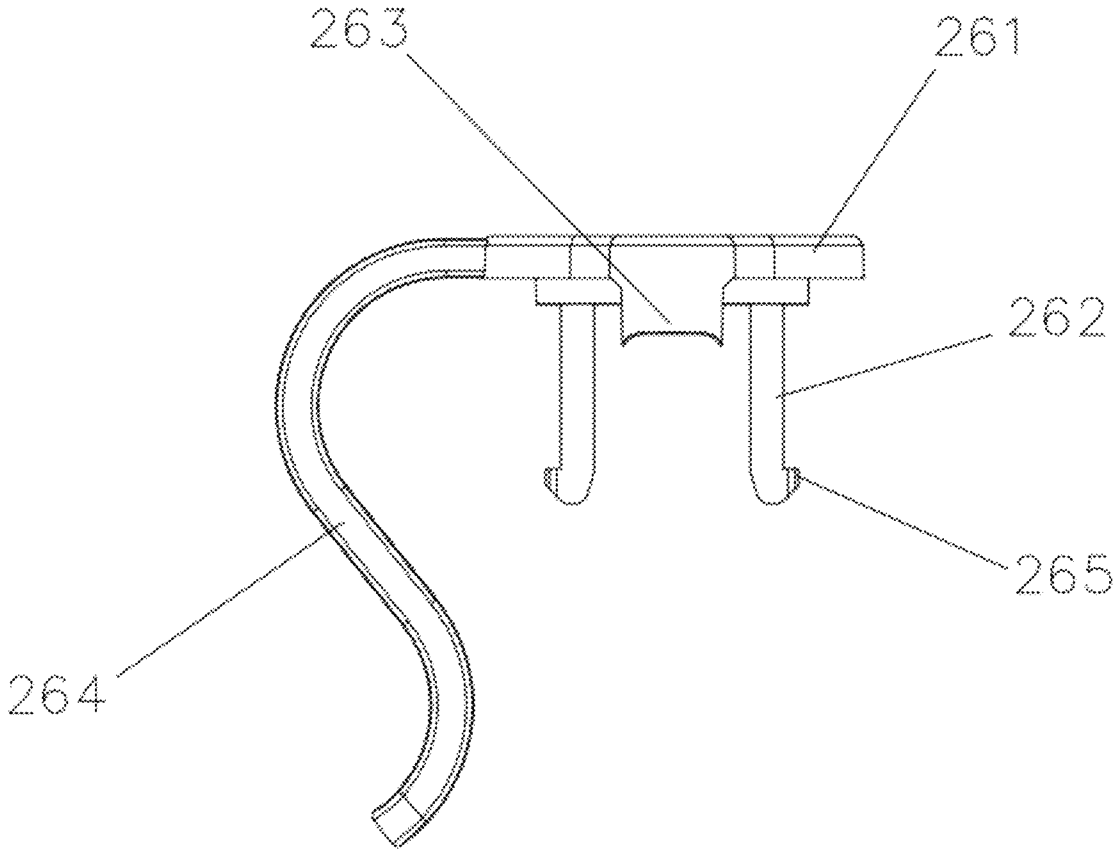
FIG. 4 shows a schematic structural diagram of an end cover according to an embodiment of the disclosure.
Figure 5:
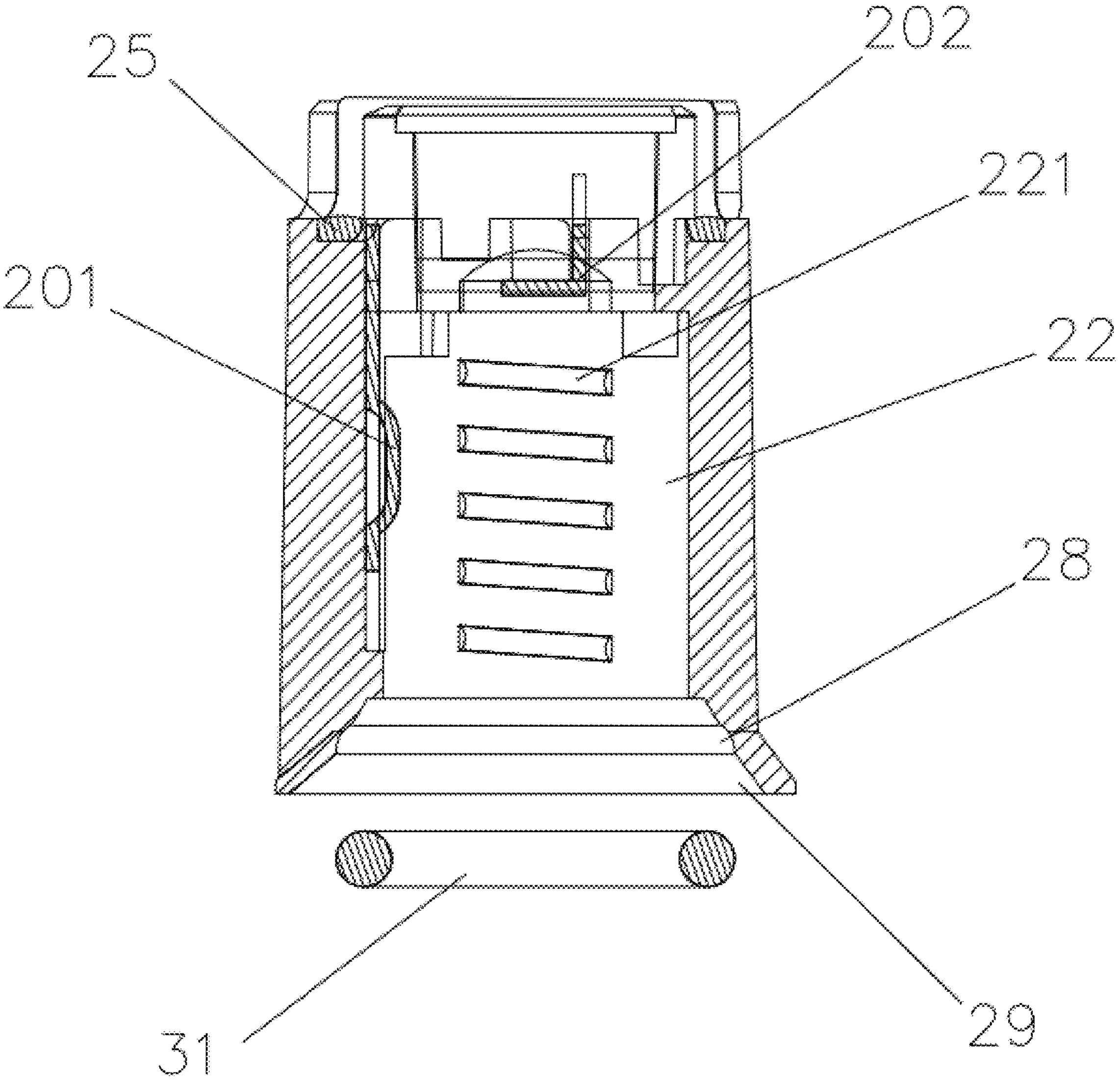
FIG. 5 shows a sectional schematic diagram of a lamp holder body according to an embodiment of the disclosure.
Figure 6:
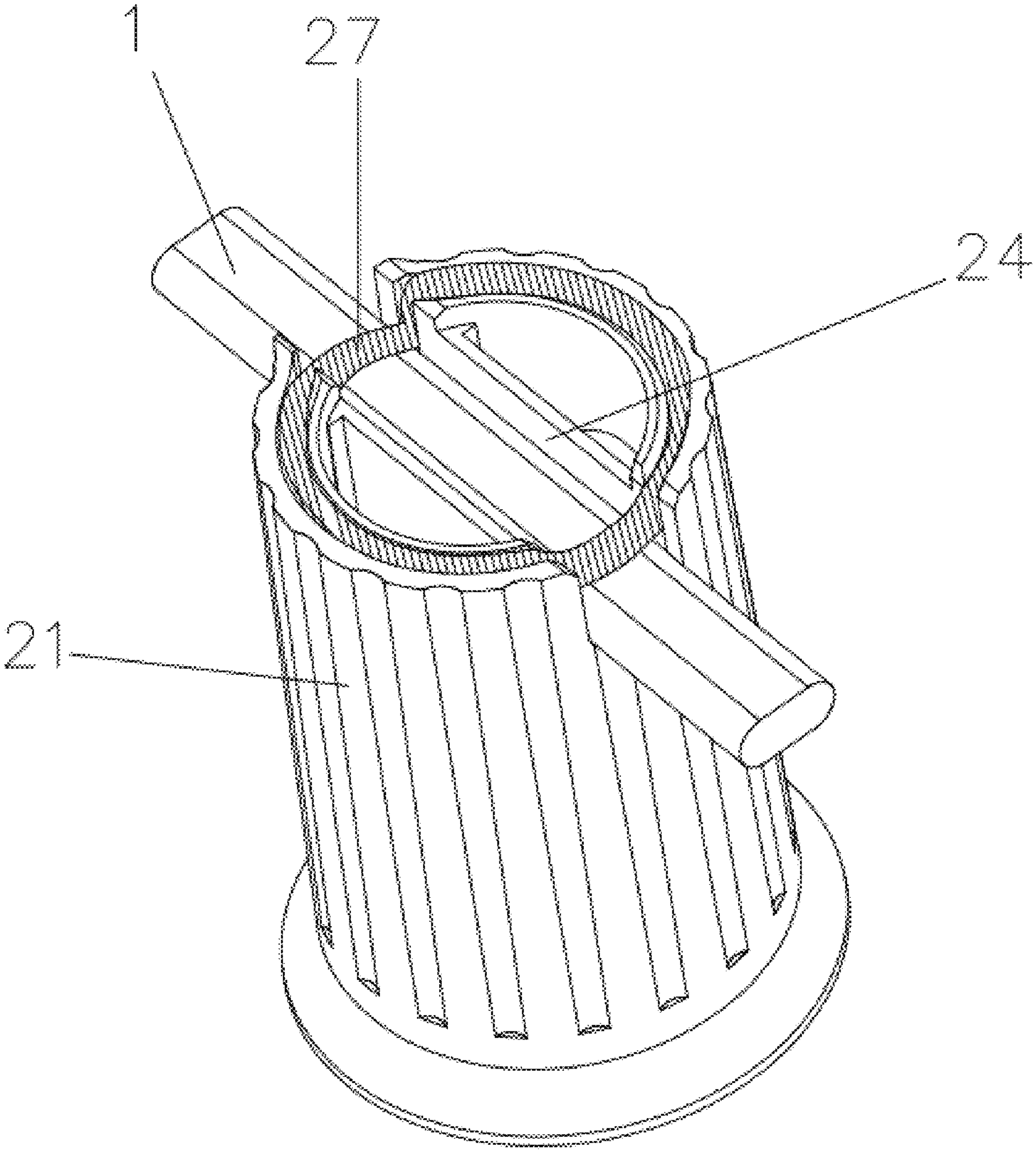
FIG. 6 shows a connection schematic diagram of a series-connected wire and a linear groove according to an embodiment of the disclosure.
Figure 7:
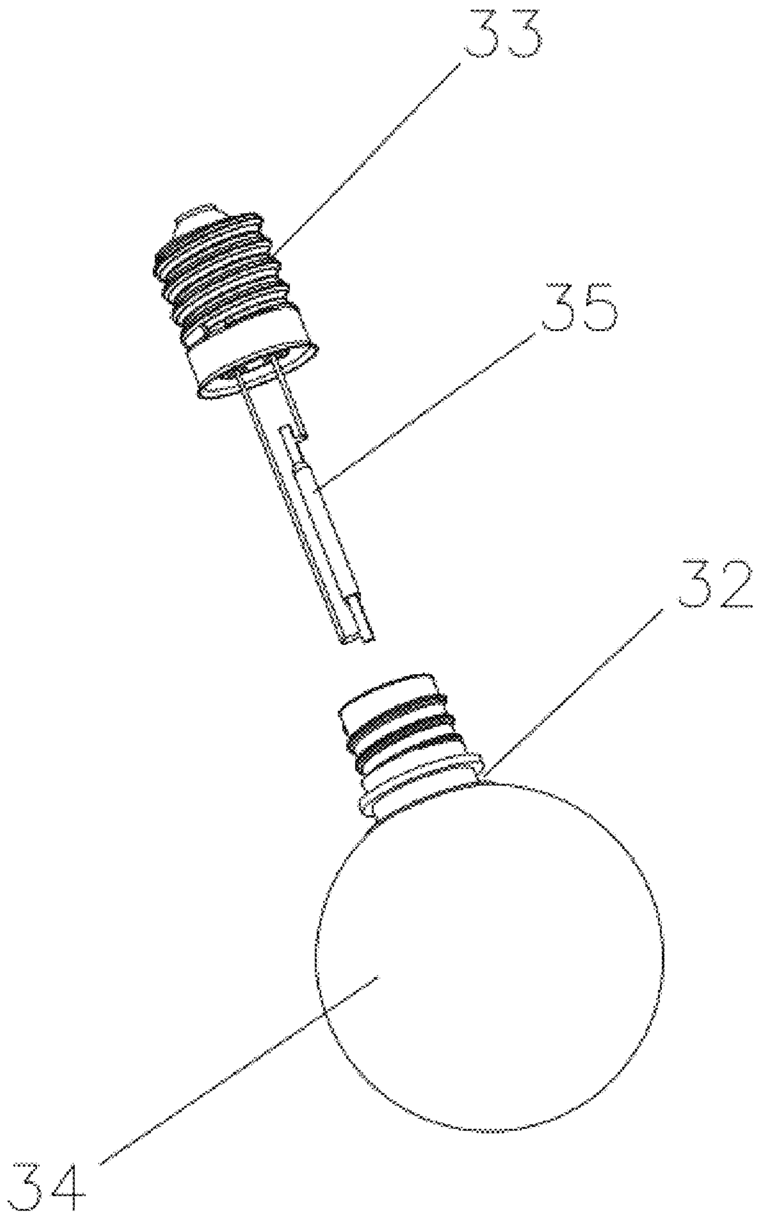
FIG. 7 shows a reference exploded structural diagram of an LED bulb according to an embodiment of the disclosure.
Figure 8:
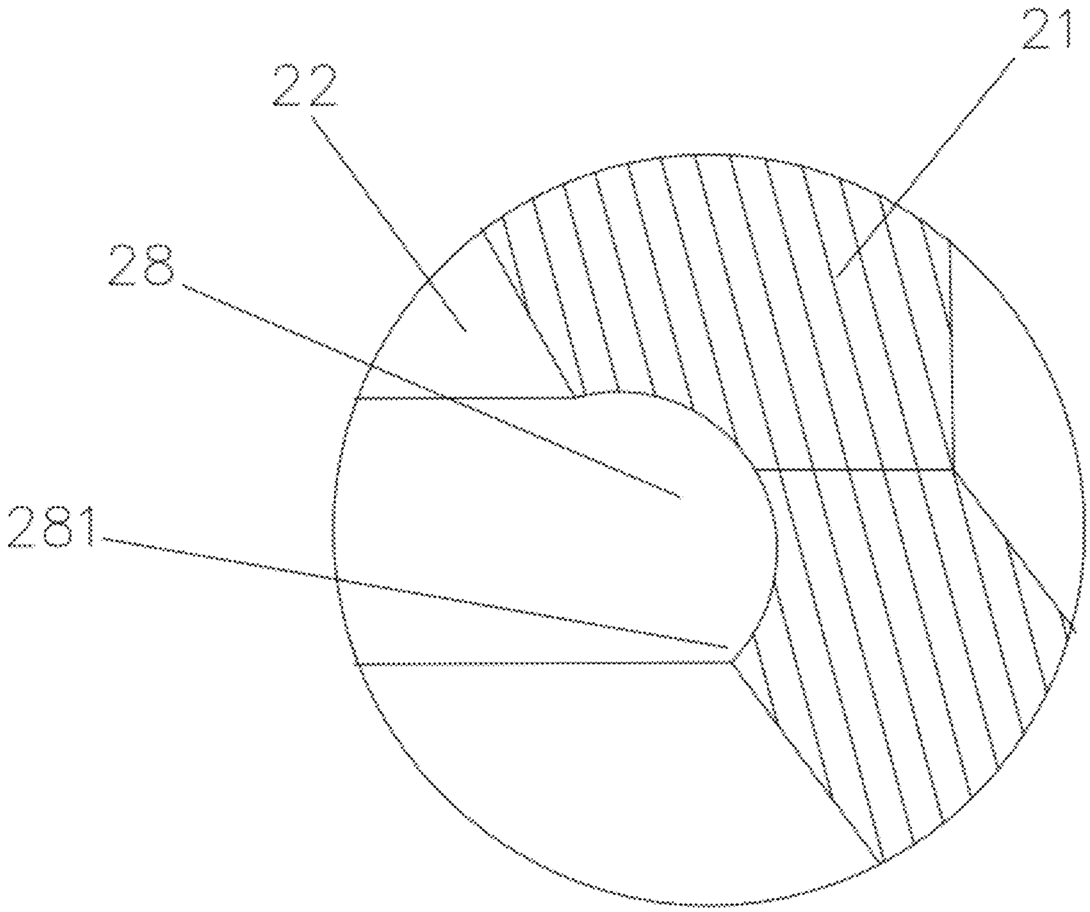
FIG. 8 shows a schematic structural diagram of a waterproof groove according to an embodiment of the disclosure.

Referring to FIG. 4, the end cover 26 may include a cover plate 261, a pin 262 and a wire-pressing rib 263, the pin 262 is inserted into and fixed to the lamp holder body 21, the cover plate 261 abuts against the first sealing member 25, and the wire-pressing rib 263 abuts against the series-connected wire 1 in the linear groove 24. The lamp holder body 21 is provided with a plug-in port 211, an end of the pin 262 is provided with a reverse hook, and after the pin 262 is inserted into the plug-in port 211, the reverse hook engages the end surface on the other side of the plug-in port 211 to achieve a limiting effect, such that the end cover 26 is connected and fixed to the lamp holder body 21. The wire-pressing rib 263 and the linear groove 24 correspond in width. Referring to FIG. 4, edges of two sides of an end surface of the wire-pressing rib 263 that applies pressure to the series-connected wire 1 are provided with protruding structures. After the end cover 26 is mounted, the wire-pressing rib 263 applies pressure to the series-connected wire 1 continuously, and the wire-pressing rib 263 further abuts against the first sealing member 25, such that both ports of the linear groove 24 are fully sealed.

As another embodiment of the annular sealing groove 23, the annular sealing groove 23 may include a first curved segment 231, a first concave segment 232, a second curved segment 233 and a second concave segment 234 connected in sequence, the first concave segment 232 and the second concave segment 234 correspond to the linear groove 24, and when located in the linear groove 24, a surface of the series-connected wire 1 is at least flush with the first curved segment 231 or extends beyond an upper surface of the first curved segment 231. The annular groove 23 is of a special-shaped structure with height differences. The first curved segment 231 and the second curved segment 233 are located at the top end of the lamp holder body 21, the first concave segment 232 and the second concave segment 234 are U-shaped, bottom grooves of the first concave segment 232 and the second concave segment 234 correspond to the bottom of the linear groove 24, two side grooves of the first concave segment 232 and the second concave segment 234 correspond to two side walls of the linear groove 24, and after the annular sealing groove 23 is filled with the first sealing member 25 and the series-connected wire 1 is placed into the linear groove, the series-connected wire 1 abuts against the first sealing member 25 filling the first concave segment 232 and the second concave segment 234, such that the bottom and two sides of both ports of the linear groove 24 are sealed. The diameter of the cover plate 261 is greater than the diameter of the annular sealing groove 23. After the end cover 26 is assembled, the cover plate 261 abuts against the first sealing member 25 filling the first curved segment 231 and the second curved segment 233, such that the top of the lamp holder body 21 is enclosed to prevent rainwater or water vapor from entering the interior of the linear groove 24 or the lamp holder body 21 from the gap where the end cover 26 is connected to the lamp holder body 21.

The end cover 26 is provided with a hanging lug 264. The hanging lug 264 is a curved strip having a degree of elasticity. After the end cover 26 is mounted on the lamp holder body 21, a portion of the hanging lug 264 abuts against the lamp holder body 21, such that a hanging hole is formed between the hanging lug 264 and the lamp holder body 21, so as to facilitate the hanging of the light string on objects such as ropes and thin rods for use.

A second sealing member 31 is further disposed between each of the lamp holders 2 and each of the LED bulbs 3, and each of the LED bulbs 3 is threadedly connected to each of the lamp holders 2 to apply a pressure to the second sealing member 31, thereby forming sealing. After each of the LED bulbs 3 is mounted, under the action of the first sealing member 25 and the second sealing member 31, each of the lamp holders 2 is fully sealed to perfectly prevent rainwater, water vapor and the like from penetrating into the interior of the lamp holder 2, with a good waterproof effect.

As an embodiment of the second sealing member 31, each of the lamp holders 2 is provided with a waterproof groove 28, and the second sealing member 31 is snap-fitted and secured in the waterproof groove 28. The waterproof groove 28 is formed near an open end of the accommodating cavity 22, the second sealing member 31 is a sealing rubber ring, the second sealing member 31 is placed in the waterproof groove 28, and each of the LED bulbs 3 abuts against the second sealing member 31 after being mounted, such that the open end of the accommodating cavity 22 is enclosed, thereby sealing each of the lamp holders 2. In this embodiment, regardless of the shape variation of each of the LED bulbs 3, each of the LED bulbs 3 abuts the second sealing member 31 after being mounted to achieve sealing. During use of this light string, usually, the LED bulbs have already been mounted. However, in some cases, for example, a certain LED bulb fails, it is necessary to replace the LED bulb at this time. Therefore, the waterproof groove 28 is provided with the reverse buckling portion 281, and during assembly, after the second sealing member 31 is mounted in the waterproof groove 28, due to the action of the reverse buckling portion, the second sealing member 31 is permanently confined within the waterproof groove 28 and does not fall off. Experiments show that the function of the reverse buckling portion is beneficial.

As another embodiment where the second sealing member 31 is mounted, each of the LED bulbs 3 may include a bulb shell 34, a snap ring 32 is disposed at a neck of the bulb shell 34, and the second sealing member 31 is disposed at the snap ring 32. In this solution, the second sealing member 31 is a sealing rubber ring, the second sealing member 31 is detachably connected to each of the LED bulbs 3, the open end of the accommodating cavity 22 is provided with a flared portion 29 in a trumpet flared shape, and after each of the LED bulbs 3 is mounted, the second sealing member 31 abuts against the flared portion 29 to seal each of the lamp holders 2. In this embodiment, second sealing members 31 with different thicknesses may be used according to the shapes of the LED bulbs 3 to achieve a perfect sealing effect.

The annular sealing groove 23 is filled with a surface sealing member 27, and the series-connected wire 1 is located between the first sealing member 25 and the surface sealing member 27. The surface seal member 27 is formed by dispensing or coating an adhesive. After the series-connected wire 1 is placed into the linear groove 24 and abutting against the first sealing member 25, the adhesive is dispensed or coated along the annular sealing groove 23 to form the surface seal member 27. After being assembled, the end cover 26 abuts against the surface seal member 27, such that the end of each of the lamp holders 2 is fully sealed.

Each of the lamp holders 2 is provided with a first electrical connecting piece 201 and a second electrical connecting piece 202, the first electrical connecting piece is disposed on one side of the accommodating cavity 22 and is provided with a first pointed protrusion 203 that penetrates into the linear groove 24, and the second electrical connecting piece 202 is disposed at a bottom of the accommodating cavity 22 and is provided with a second pointed protrusion 204 that penetrates into the linear groove 24. The series-connected wire 1 is composed of at least two wires isolated by insulation, and the series-connected wire 1 is mounted behind the linear groove 24. The first pointed protrusion 203 and the second pointed protrusion 204 penetrate into different wires, respectively, such that the first electrical connection piece 201 and the second electrical connection piece 202 are electrified to generate two electrodes in each of the lamp holders 2, thereby facilitating the electrical connection between each of the LED bulbs 3 and the each of the lamp holders 2.

Each of the LED bulbs 3 may include a metal lamp base 33, a bulb shell 34 and a light-emitting unit 35 disposed in the bulb shell 34 and electrically connected to the metal lamp base 33, the metal lamp base 33 is provided with a thread, and a connecting portion 221 adapted to the metal lamp base 33 is disposed on an inner wall of the accommodating cavity 22. At least one light-emitting unit 35 is disposed. The light-emitting unit 35 is connected to the metal lamp base 33 via an electrical wire. After each of the LED bulbs 3 is mounted in each of the lamp holders 2, the metal lamp base 33 engages with the connecting portion 221. Meanwhile, the thread of the metal lamp base 33 is further connected to the first electrical connecting piece 201. The end of the metal lamp base 33 is connected to the second electrical connecting piece 202 via an electrical wire, such that each of the LED bulbs 3 is electrically connected to the series-connected wire 1 to form positive and negative electrode circuits, and the light-emitting unit 35 emits light.

The first sealing member 25 is formed by dispensing an adhesive or is a special-shaped sealing ring, and the first sealing member 25 protrudes beyond the annular sealing groove 23 so as to cooperate with the end cover 26 to form sealing. The first sealing member 25 may be formed by dispensing a liquid sealant after curing. After the series-connected wire 1 and the end cover 26 are in contact with the first sealing member 25, the drop-shaped first sealing member 25 is fully diffused, such that the first sealing member 25 fully fits the series-connected wire 1 and the end cover 26. In consideration of assembly of the lamp holders 2, the first sealing member 25 may be a special-shaped sealing ring. During assembly of the lamp holders 2, the special-shaped sealing ring may be directly embedded into the annular sealing groove 23 and the series-connected wire 1 and the end cover 26 are quickly mounted, such that the production speed of the product is increased.

The above content is merely a preferred embodiment of the disclosure. For those skilled in the art, modifications may be made to the specific implementation modes and application scope in accordance with the concept of the disclosure. The content of this specification shall not be construed as a limitation on the disclosure.

Various embodiments of the disclosure may have one or more of the following effects. In some embodiments, the sealed and waterproof LED light string structure provided by the disclosure may include the series-connected wire, where the series-connected wire is connected to the plurality of lamp holders, and the lamp holders are detachably connected to the LED bulbs; each of the lamp holders is provided with the lamp holder body, where the lamp holder body is provided with the accommodating cavity and the annular sealing groove, the lamp holder body is provided with the linear groove intersecting with the annular sealing groove, each of the lamp holders is further provided with the end cover, and the end cover is snap-fitted to the lamp holder body, and applies pressure to the series-connected wire, thereby maintaining the formation of an end seal at the linear groove. In other embodiments, the disclosure has the following advantages: after the series-connected wire is connected into the linear groove, by dispensing an adhesive into the annular sealing groove or placing the special-shaped sealing ring, and then pressing the special-shaped sealing ring with the end cover, wiring ends of the lamp holders are sealed. In further embodiments of this disclosure, after the bulbs are mounted on the lamp holders, inner cavities of the lamp holders may be sealed, such that the lamp holders are fully enclosed to perfectly preventing rainwater and the like from penetrating into the interiors of the lamp holders, with a good waterproof effect. In further embodiments, the disclosure may provide a sealed and waterproof light-emitting diode (LED) light string structure, which may have the advantages of being sealed and waterproof.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A sealed and waterproof light-emitting diode (LED) light string structure, comprising a series-connected wire (1), an end of the series-connected wire (1) being connected to a plug (11) and another end thereof being connected to a socket (12), wherein:
- the series-connected wire (1) is connected to a plurality of sealed and waterproof lamp holders (2), and the lamp holders (2) are detachably connected to LED bulbs (3);
- the plurality of lamp holders (2) are spaced apart and located between the plug (11) and the socket (12);
- each of the lamp holders (2) is provided with a lamp holder body (21), wherein:
  - the lamp holder body (21) is provided with an accommodating cavity (22) and an annular sealing groove (23),
  - the lamp holder body (21) is provided with a linear groove (24) intersecting with the annular sealing groove (23),
  - the annular sealing groove (23) is filled with a first sealing member (25), and
  - the series-connected wire (1) passes through the linear groove (24) and is located above the first sealing member (25);
- each of the lamp holders (2) is further provided with an end cover (26), and the end cover (26) is snap-fitted to the lamp holder body (21) and applies a pressure to the series-connected wire (1), thereby maintaining a formation of an end seal at the linear groove (24); and
- a second sealing member (31) is further disposed between each of the lamp holders (2) and each of the LED bulbs (3), and each of the LED bulbs (3) is threadedly connected to each of the lamp holders (2) to apply a pressure to the second sealing member (31), thereby forming a sealing, wherein:
  - each of the LED bulbs (3) comprises a metal lamp base (33), a bulb shell (34), and a cylindrical LED filament (35);
  - the LED filament (35) is disposed in the bulb shell (34) and electrically connected to the metal lamp base (33);
  - the metal lamp base (33) is provided with a thread; and
  - a connecting portion (221) adapted to the metal lamp base (33) is disposed on an inner wall of the accommodating cavity (22).

2. The sealed and waterproof LED light string structure according to claim 1, wherein:

the annular sealing groove (23) comprises a first curved segment (231), a first concave segment (232), a second curved segment (233), and a second concave segment (234) connected in sequence; and the first concave segment (232) and the second concave segment (234) correspond to the linear groove (24).

3. The sealed and waterproof LED light string structure according to claim 1, wherein:

the annular sealing groove (23) comprises a first curved segment (231), a first concave segment (232), a second curved segment (233), and a second concave segment (234) connected in sequence;

the first concave segment (232) and the second concave segment (234) correspond to the linear groove (24); and when located in the linear groove (24), a surface of the series-connected wire (1) is at least flush with the first curved segment (231) or extends beyond an upper surface of the first curved segment (231).

4. The sealed and waterproof LED light string structure according to claim 1, wherein:

the annular sealing groove (23) is filled with a surface sealing member (27); and the series-connected wire (1) is located between the first sealing member (25) and the surface sealing member (27).

5. The sealed and waterproof LED light string structure according to claim 1, wherein:

each of the lamp holders (2) is provided with a waterproof groove (28); and the second sealing member (31) is snap-fitted and secured in the waterproof groove (28).

6. The sealed and waterproof LED light string structure according to claim 1, wherein:

each of the LED bulbs (3) comprises the bulb shell (34);

a snap ring (32) is disposed at a neck of the bulb shell (34); and the second sealing member (31) is disposed at the snap ring (32).

7. The sealed and waterproof LED light string structure according to claim 1, wherein:

each of the lamp holders (2) is provided with a first electrical connecting piece (201) and a second electrical connecting piece (202);

the first electrical connecting piece is disposed on one side of the accommodating cavity (22) and is provided with a first pointed protrusion (203) that penetrates into the linear groove (24); and the second electrical connecting piece (202) is disposed at a bottom of the accommodating cavity (22) and is provided with a second pointed protrusion (204) that penetrates into the linear groove (24).

8. The sealed and waterproof LED light string structure according to claim 1, wherein:

the end cover (26) comprises a cover plate (261), a pin (262), and a wire-pressing rib (263);

the pin (262) is inserted into and fixed to the lamp holder body (21);

the cover plate (261) abuts against the first sealing member (25); and the wire-pressing rib (263) abuts against the series-connected wire (1) in the linear groove (24).

9. The sealed and waterproof LED light string structure according to claim 1, wherein:

the first sealing member (25) is formed by dispensing an adhesive or is a special-shaped sealing ring; and the first sealing member (25) protrudes beyond the annular sealing groove (23) so as to cooperate with the end cover (26) to form sealing.

* * * * *